(12) United States Patent
Gencer et al.

(10) Patent No.: US 7,217,749 B2
(45) Date of Patent: *May 15, 2007

(54) PROCESS FOR INFUSING AN ALKALI METAL NITRITE INTO A SYNTHETIC RESINOUS MATERIAL

(75) Inventors: Mehmet A. Gencer, Brecksville, OH (US); Sunggyu Lee, Columbia, MO (US); Abhay Sardesai, Columbia, MO (US); Donald A. Kubik, Dickenson, ND (US)

(73) Assignee: Northern Technologies International Corporation, Beachwood, OH (US)

( * ) Notice: Subject to any disclaimer, the term of this patent is extended or adjusted under 35 U.S.C. 154(b) by 295 days.

This patent is subject to a terminal disclaimer.

(21) Appl. No.: 10/844,838

(22) Filed: May 13, 2004

(65) Prior Publication Data

US 2004/0208996 A1 Oct. 21, 2004

Related U.S. Application Data

(63) Continuation-in-part of application No. 10/761,166, filed on Jan. 20, 2004, now abandoned, which is a continuation-in-part of application No. 10/347,661, filed on Jan. 20, 2003.

(51) Int. Cl.
*C08J 3/20* (2006.01)
*C08K 3/28* (2006.01)

(52) U.S. Cl. ................ 523/340; 524/429
(58) Field of Classification Search ................ 523/340; 524/429
See application file for complete search history.

(56) References Cited

U.S. PATENT DOCUMENTS

| | | |
|---|---|---|
| 2,581,907 A | 1/1952 | Smith, Jr. et al. |
| 3,804,796 A | 4/1974 | Alexandre et al. |
| 4,290,912 A | 9/1981 | Boerwinkle et al. |
| 4,441,886 A | 4/1984 | Muchmore et al. |
| 4,491,526 A | 1/1985 | Deck |
| 4,582,731 A | 4/1986 | Smith |
| 4,598,006 A | 7/1986 | Sand |
| 4,678,684 A | 7/1987 | Sand |
| 4,734,451 A | 3/1988 | Smith |
| 4,820,752 A * | 4/1989 | Berens et al. ........... 523/340 |
| 4,992,308 A | 2/1991 | Sunol |
| 5,043,280 A | 8/1991 | Fischer et al. |
| 5,049,328 A | 9/1991 | Meyer et al. |
| 5,080,692 A | 1/1992 | Lee et al. |
| 5,094,892 A | 3/1992 | Kayihan |
| 5,128,382 A | 7/1992 | Elliott, Jr. et al. |
| 5,169,687 A | 12/1992 | Sunol |
| 5,233,021 A | 8/1993 | Sikorski |
| 5,252,620 A | 10/1993 | Elliott, Jr. et al. |
| 5,340,614 A * | 8/1994 | Perman et al. ........... 427/2.24 |
| 5,376,744 A | 12/1994 | Kennedy et al. |
| 5,386,055 A | 1/1995 | Lee et al. |
| 5,403,487 A | 4/1995 | Lodaya et al. |
| 5,508,060 A | 4/1996 | Perman et al. |
| 5,516,952 A | 5/1996 | Lee et al. |
| 5,663,237 A | 9/1997 | Lee et al. |
| 5,696,195 A | 12/1997 | Tuminello et al. |
| 5,766,637 A | 6/1998 | Shine et al. |
| 6,030,663 A | 2/2000 | McClain et al. |
| 6,123,984 A | 9/2000 | Fumio |
| 6,156,933 A | 12/2000 | Poliakoff et al. |
| 6,340,722 B1 | 1/2002 | Lee et al. |

* cited by examiner

*Primary Examiner*—Kriellion Sanders
(74) *Attorney, Agent, or Firm*—Hudak, Shunk & Farine Co. LPA

(57) ABSTRACT

A process for rapidly infusing a synthetic resinous substrate with an alkali metal nitrite, comprises (a) essentially completely dissolving the alkali metal nitrite in supercritical carbon dioxide to form a solids-free solution having from about 1 to 15% by weight of the alkali metal nitrite; (b) contacting the synthetic resinous substrate with the solution for a time sufficient to transfer at least a portion of the alkali metal nitrite into the synthetic resinous substrate while maintaining the carbon dioxide under supercritical conditions; and, (c) decreasing pressure or temperature, or both, on the synthetic resinous material sufficiently to evolve carbon dioxide and leave micronized solid alkali metal nitrite crystals in an amount less than 2% by weight essentially uniformly distributed in the synthetic resinous substrate. If desired, up to about 15% by weight of sodium nitrite or potassium nitrite may be transported and deposited in the substrate if transparency of the substrate is irrelevant, because the substrate tends to become opaque.

22 Claims, No Drawings

PROCESS FOR INFUSING AN ALKALI METAL NITRITE INTO A SYNTHETIC RESINOUS MATERIAL

CROSS-REFERENCE TO RELATED APPLICATION

This application is a continuation-in-part application of Ser. No. 10/761,166 filed Jan. 20, 2004 now abandoned which is a continuation-in-part application of Ser. No. 10/347,661 filed Jan. 20, 2003.

FIELD OF THE INVENTION

The present invention relates to a process for transferring a particular class of salts, namely an alkali metal salt, from supercritical carbon dioxide ("SC—$CO_2$") in which the salt is in solution, directly into a synthetic resinous substrate, for example, a film or shaped article, in which the only other way of incorporating the salt is by physically mixing it into the polymer, then melt-processing the mixture.

The Problem:

It is desirable to impregnate polymeric film or a shaped polymeric article with a combination of an inorganic salt and a phenol, namely an alkali metal nitrite and a hindered phenol, which article may have been molded under temperature conditions deleterious to the combination; and, to ensure that the nitrite and phenol are uniformly distributed throughout the body of the article. The problem is particularly serious when an article is molded from a substantially transparent, water-white polyolefin protected with a hindered phenol which is degraded when the polyolefin is molded at a temperature above about 121° C. (250° F.), as evidenced by the polymer turning yellow. It is also desirable that crystalline particles of the ingredients infused into the polymer, be invisible to the human eye. Such invisibility results when the particles are smaller than about 10 μm (micrometers) equivalent diameter. By "equivalent diameter" is meant the diameter of a spherical particle of equal volume. All references herein to particle size refer to the equivalent diameter. At present, the sodium nitrite is incorporated into the polymer as particles in the size range from about 10 μm to 44 μm, all of which pass through a 325 mesh screen or 45 μm (Standard Test Sieves), as smaller particles do not get uniformly distributed when an article is molded, or film is extruded, with polymer containing the smaller particles. Further, non-uniformly distributed particles, whether large or small in the range from about 10–44 μm, causes the polymer's melt-processed surface to be noticeably rough to the touch, compared to a smooth surface of film of the same polymer without any sodium nitrite particles. In film, or molded articles with a cross-section of less than 50 μm (0.002" or 2 mil), particles smaller than 10 μm are not visible to the human eye; larger particles are. The limitation of concentration is necessary because a concentration of particles in an amount of 2% by weight, or more, in the polymer substrate becomes visible to the human eye, even if the particles are smaller than 10 μm. Though the emphasis is on the temperature sensitivity of a protective antioxidant or uv light stabilizer, a biodegradable polymer may itself be equally sensitive.

BACKGROUND OF THE INVENTION

The conventional way of introducing a solid ingredient into a polymer is by melt-processing a mixture of the ingredient and polymer, either in an extruder, or by plasticizing the polymer sufficiently so as to be able to mix the ingredient into the plasticized mass. Such a procedure may be applicable if an ingredient can withstand a temperature at which the polymer is plasticizable, in the case of polyvinyl chloride (PVC), this temperature is in the range from about 180° C. to about 200° C.

When the properties of an ingredient are to be preserved when it is incorporated into a polymer, melt-processing an ingredient which is degradable at a temperature required for melt-processing is thus negated.

In the prior art, SC—$CO_2$ has been used mainly to extract an organic ingredient from a substrate in which it is distributed, or to separate one organic compound from another. Each of the foregoing relies upon the known higher solvent power of a fluid as its density increases. A supercritical fluid is sufficiently dense to swell a polymer even if the polymer is essentially insoluble in the supercritical fluid, by virtue of forcing molecules of the supercritical fluid into the pores of the polymer, as taught by U.S. Pat. No. 5,340,614 to Perman et al., provided a carrier liquid was also used to "carry" the additive into the pores of the polymeric substrate. However, Perman et al were unconcerned with either uniformity of distribution of infused particles, or their size, and make no mention of either.

Unlike the foregoing, U.S. Pat. No. 4,820,752 teaches "infusing into a rubber or plastic polymeric material" (sic) any additive, liquid or solid, which has a "degree of solubility in said polymeric material when said polymeric material is in a swollen state", using a normally gaseous fluid which could be compressed to supercritical conditions. Clearly, solubility of the additive in the polymer is required, the degree of solubility being at least 0.1 percent, and under the high pressure conditions described, any microporous polymer substrate will necessarily become swollen.

Moreover, it is not clear whether the fluid is required to dissolve either the additive or the polymer, or both, or simply swell the polymer, such equivocation being stated as follows: "A fluid may have sufficient solvent or swelling power to be useful in practicing this invention if sufficiently compressed at temperatures above, equal to, or below the critical temperature of the fluid" (see '752 patent, col 4, lines 45–49). Evidently the only requirement of the fluid to provide all the necessary properties to infuse a polymer with any additive is that the fluid be derived by compressing a normally gaseous fluid. Such evidence is provided in Examples 1 and 2 teaching the use of carbon dioxide at 22° C. and pressure of $59.6 \times 10^5$ Pa (or 5960 kPa), and in Examples 3 and 4 at 22° C. and pressure of $65.1 \times 10^5$ Pa (or 6510 kPa), under which conditions carbon dioxide is not supercritical. The supercritical conditions for carbon dioxide are 31.4° C. and 73.4 atm (7435.42 kPa). Only Example 6 deals with SC—$CO_2$ which was used to impregnate a polyurethane sheet with progesterone, the solubility of which, in SC—$CO_2$, or lack thereof, was not stated.

Still further, the '752 patent states: "In accordance with the present invention, an additive desired to be included in a rubber or plastic composition is dissolved in a compressed normally gaseous fluid." ('752, col 2, lines 16–17) but requires only that the additive have a "degree of solubility" stated as follows: "The fluid and additive are chosen so that the additive has a degree of solubility in the polymer into which it is to be infused and so that the solution of fluid and additive has a degree of solubility in the polymer and is capable of swelling the polymer." ('752, col 2, lines 29–33).

If the "degree of solubility" included essentially complete solubility, then the polymer too would be dissolved in the "the solution of fluid and additive".

As evidenced by illustrative example 1, "other sample chips were exposed in a pressure vessel to carbon dioxide in the presence of solid naphthalene at room temperature and a pressure of $59.6 \times 10^5$ pascals for 92 hours;" indicating that all the naphthalene was not in solution. This may be attributable to the fact that the carbon dioxide was not under supercritical conditions. The only example where SC—$CO_2$ was used (Example 6) states that a sheet of polyurethane "was exposed to progesterone in the presence of carbon dioxide at a temperature of 45° C. and a pressure of $151.6 \times 10^5$ pascals for 4.5 hr" indicating not all the progesterone was in solution. Thus, Berens et al were unaware that solid particles of relatively large size could be transported if fully dissolved in SC—$CO_2$ to form a solids-free solution, and the solids redeposited in a polymer substrate as micronized crystals.

Persons of ordinary skill in the art are well aware that the solubility of an additive in a supercritical fluid, and in SC—$CO_2$ in particular, cannot be predicted. This is particularly true for inorganic salts. For example, as shown below, sodium nitrite is soluble in SC—$CO_2$, but sodium chloride is not. In view of such unpredictability it should now be evident that a teaching that any normally solid additive, whether organic or inorganic, may be transferred from a liquid under pressure into a swellable polymer, as taught in the '752 patent, is at best overly broad.

U.S. Pat. No. 4,290,912 issued to Boerwinkle et al, about two decades ago, disclosed that an inorganic nitrite, and in particular, an alkali metal nitrite, e.g. potassium nitrite, sodium nitrite and calcium nitrite, in combination with a 2,4,6-trisubstituted phenol provided an effective volatile corrosion inhibitor (VCI) when distributed in a lower ($C_2$–$C_5$) polyolefin (PO) polymer. A specific '912 combination comprised about equal parts (1.485 phr each) by weight of sodium nitrite and a 2,4,6-tri-substituted phenol containing 9 to 24 carbon atoms, specifically 2,6-di-tert-butyl-4-methyl phenol, along with small amounts of one or more inert ingredients such as fumed silica and oleyl alcohol which are known to possess no anti-corrosive properties. Effectiveness of the '912 film was unconcerned with the primary particle size of the sodium nitrite because the '912 patent did not address the problems (i) of uniformity of distribution, (ii) of particle size, or (iii) of maintaining transparency of extruded film or molded articles having smooth surfaces.

SUMMARY OF THE INVENTION

It has been discovered that an alkali metal nitrite which is substantially insoluble in liquid carbon dioxide which is not under supercritical conditions, becomes highly soluble when the conditions become supercritical. The expectation that all alkali metal salts are highly soluble in supercritical carbon dioxide "SC—$CO_2$" is negated by the substantial insolubility of sodium chloride in SC—$CO_2$. Moreover, one may dissolve crystals of an alkali metal nitrite larger than 10 µm in SC—$CO_2$ and by impregnating a polymer substrate with the solution, deposit crystals smaller than 10 µm in the substrate. The most preferred alkali metal nitrite is sodium nitrite.

A process for rapidly infusing a synthetic resinous substrate with an alkali metal nitrite, comprises (a) essentially completely dissolving the alkali metal nitrite in SC—$CO_2$ to form a solids-free solution having from about 1 to 15% by weight of the alkali metal nitrite; (b) contacting the synthetic resinous substrate with the solution for a time sufficient to transfer at least a portion of the alkali metal nitrite into the synthetic resinous substrate while maintaining the carbon dioxide under supercritical conditions; and, (c) decreasing pressure or temperature, or both, on the synthetic resinous material sufficiently to evolve carbon dioxide and leave micronized solid alkali metal nitrite crystals in an amount less than 2% by weight, preferably from about 0.1% to about 1.5%, essentially uniformly distributed in the synthetic resinous substrate. If desired, up to about 15% by weight of sodium nitrite or potassium nitrite may be transported and deposited in the substrate if transparency of the substrate is irrelevant, because the substrate tends to become opaque.

By "micronized" crystals is meant that the major portion by weight of the crystals have an average particle size smaller than 10 µm. By "rapidly" is meant that from about 0.1 to less than 2% of the alkali metal nitrite crystals go into solution in the SC—$CO_2$ in less than 30 minutes. Such speed is essential for the impregnation stage of a commercially viable two-stage process in which it is necessary to recycle and recompress to supercritical conditions the recovered carbon dioxide.

By "uniformly distributed" is meant that the uniformity of dispersed particles in the film may be quantified by known microscopic techniques, or by a blown film test. In the blown film test, the polymer containing solid powder particles is extruded through a blown film apparatus which produces a film about 0.025 mm (1 mil) thick, and this film is placed over a light source of appropriate wavelength and intensity to enable one to quantify the number of particles which show up as "imperfections"; and the size of each is also visible under appropriate magnification. No unit area of the film appears to have a substantially higher concentration of particles than another.

The foregoing process is preferably carried out with the alkali metal nitrite in combination with an organic compound which forms a solids-free solution in SC—$CO_2$, in a two-stage process comprising, (i) dissolving an alkali metal nitrite and the organic compound in carbon dioxide held in an autoclave under supercritical conditions to form a solution containing from about 1 to 15% by weight of sodium nitrite and organic compound, (ii) filtering the solution to ensure that substantially no particulate solids are present in filtered solution; (iii) contacting a polymeric substrate with the filtered solution for less than 30 minutes so as to transfer enough sodium nitrite and organic compound into the substrate so as to infuse it with less than 2% by weight of each, an alkali metal nitrite and organic compound. The impregnated substrate necessarily becomes swollen due to the high-pressure entry of SC—$CO_2$ molecules, but such swollen condition reverts to normal when the carbon dioxide leaves the substrate.

In another embodiment of the process, the SC—$CO_2$ may be combined with a second fluid miscible (forming a common supercritical phase) with carbon dioxide under supercritical conditions, which second supercritical fluid, present in a minor amount by weight relative to the carbon dioxide, facilitates dissolution of an organic compound such as a hindered phenol or aromatic amine, in the common supercritical phase. A preferred second fluid is selected from the group consisting of ethylene, ethane, nitrous oxide, chlorotrifluoromethane and trifluoromethane which have critical temperatures and pressures in the vicinity of those for SC—$CO_2$ and can be readily recovered and recycled together.

The process described herein may be repeated on a polymer substrate which has been previously impregnated, and from which the impregnated solid crystals have been removed, as for example, by evolution over a long period of time, as when sodium nitrite crystals are used as a VCI.

DETAILED DESCRIPTION OF THE INVENTION

A fluid, either gas or liquid at room temperature (25° C.) and pressure (1 atm or 14.7 psia or 101.3 kPa), when subjected to the necessary combination of pressure and temperature, both of which are higher than the critical pressure and critical temperature of the fluid, produces a supercritical fluid. Above its critical temperature (Tc), a gaseous fluid cannot be converted to a liquid regardless of the pressure exerted on the gas.

It is essential that alkali metal nitrite crystals be essentially completely soluble in $SC-CO_2$. When a dispersion of such crystals, smaller than 45 μm, in $SC-CO_2$, is contacted with a polyolefin article, before the crystals are dissolved, the crystals become non-uniformly embedded in the surface of the polymer, and are readily visible to the human eye.

EXAMPLE 1

A dispersion of sodium chloride crystals smaller than 45 μm (more than 90% are in the range from 10–44 μm) is essentially insoluble in $SC-CO_2$, as evidenced by the following experiment:

100 g of the sodium chloride crystals are deposited in a 300 ml Micro Series pressure vessel, referred to as the "main" pressure vessel, equipped with a propeller stirrer and with a transparent glass window through which the deposited crystals are visible. The main pressure vessel is closed and charged with carbon dioxide gas from a cylinder using a compressor which pressurizes the vessel to 102.04 atm or 10.35 Mpa (1500 psi) and the temperature of the vessel is maintained at 35° C. so that supercritical conditions are obtained. The outlet from the vessel is led through a fresh and uncontaminated 1 μm filter to a depressurizing valve through which the contents of the vessel are withdrawn into a second pressure vessel from which the carbon dioxide is to be recovered.

The stirrer is started and is kept running for 10 minutes at 700 rpm. Upon stopping the stirrer, the crystals are still visible. When the vessel is depressured through the filter, the filter is removed and flushed with distilled water which is tested for the presence of NaCl by the addition of a 1 molar solution of silver nitrate. A very slight white haze develops indicating very little sodium chloride is present.

The sodium chloride crystals are removed from the vessel and weighed—their weight is essentially unchanged indicating very little of the salt went into solution.

The following three additional examples 1A, 1B and 1C are conducted in the same pressure vessel, under supercritical conditions at slightly higher temperatures than example 1, and by continuously flowing $SC-CO_2$ over the NaCl crystals for 3 hr, to see if there is any change in the lack of solubility observed in example 1. At the end of each run, the crystals collected from the pressure vessel were vacuum-dried for 1 hr at 60° C., then weighed.

The results are set forth in the following Table 1.

TABLE 1

| Example | Temp. ° C. | Pressure, MPa (psia) | Flow rate* of $SC-CO_2$ | Wt. before drying | Wt. after drying |
|---|---|---|---|---|---|
| 1A | 40 | 9.69 (1407) | 4.2 | 14.174 | 14.175 |
| 1B | 50 | 13.88 (2015) | 5.3 | 13.668 | 13.668 |
| 1C | 40 | 13.78 (2000) | 4.5 | 10.001 | 10.003 |

*standard liters per minute

From the foregoing Table it is evident that there is no change in weight of the NaCl crystals before and after being subjected to flowing $SC-CO_2$, indicating that the NaCl crystals are essentially insoluble in $SC-CO_2$

EXAMPLE 2

A dispersion of the sodium nitrite crystals smaller than 45 μm is essentially insoluble in liquid carbon dioxide, not under supercritical conditions, as evidenced by the following experiment:

In a manner analogous to that described in Example 1 above, 100 g of the sodium nitrite crystals are deposited in the same main pressure vessel fitted with a freshly cleaned 5 μm filter. The vessel is then pressurized with carbon dioxide to 54.4 atm or 30 Mpa (800 psi) and the temperature of the vessel is maintained at 25° C. so that liquid is visible in the vessel. The stirrer is run for 10 min at 700 rpm and then stopped. The vessel is then depressurized through the 1 μm filter. The filtrate is collected in the second pressure vessel which is gradually depressurized so as to recover the carbon dioxide. Examination of the interior of the second pressure vessel shows that there are no crystals left. As before, after the main pressure vessel is depressurized, the filter is removed and washed with distilled water and the water analyzed for sodium nitrite which is soluble in an amount of 81.5 g/100 ml of water at 15° C. Less than 150 ppm of sodium nitrite is found, indicating that the sodium nitrite crystals are essentially insoluble in liquid, but not supercritical carbon dioxide.

In the following examples 2A, 2B, 2C and 2D the solubility of NaCl and $NaNO_2$ crystals in liquid $CO_2$ are evaluated under two slightly higher pressures using a pressure vessel which is modified by fitting a 5 μm strainer in the central vertical plane of the vessel, partitioning it so that pre-weighted and vacuum-dried crystals were placed on one side only. The pressure vessel is then pressurized with liquid $CO_2$ under conditions which ensure that it stays in the liquid phase. The crystals were soaked in the liquid $CO_2$ for 3 hour, after which the pressure vessel was slowly depressurized.

The results are set forth in the following Table 2.

TABLE 2

| Example | Crystals of | Temp., ° C. | Pressure Mpa (psia) | Soaked for, hours |
|---|---|---|---|---|
| 2A | NaCl | 28 | 10.335 (1500) | 3 |
| 2B | NaCl | 26 | 8.268 (1200) | 3 |
| 2C | $NaNO_2$ | 28 | 10.335 (1500) | 3 |

TABLE 2-continued

| Example | Crystals of | Temp., °C. | Pressure Mpa (psia) | Soaked for, hours |
|---|---|---|---|---|
| 2D | NaNO$_2$ | 26 | 8.268 (1200) | 3 |

Upon visual inspection of the internals of the pressure vessel, after controlled depressurization, no cross-over of crystals from one side of the partitioned vessel to the other is observed, irrespective of whether the crystals are NaCl or NaNO$_2$. Such evidence confirms that crystals of neither salt are soluble in high pressure, near-supercritical liquid CO$_2$ and therefore are unable to go through the strainer.

EXAMPLE 3

Sodium nitrite crystals smaller than 45 μm are essentially completely soluble in carbon dioxide under supercritical conditions, as evidenced by the following experiment:

In a manner analogous to that described in Example 1 above, 100 g of the sodium nitrite crystals are deposited in the same main pressure vessel fitted with a freshly cleaned 5 μm filter. The vessel is then pressurized with carbon dioxide to 102.04 atm or 10.35 Mpa (1500 psi) and the temperature of the vessel is maintained at 35° C. so that supercritical conditions are obtained. The stirrer is run for 10 min at 700 rpm and then stopped.

No crystals are visible in the window of the vessel. When the vessel is depressurized and removed to be inspected, no crystals are recovered.

As before, the second pressure vessel is gradually depressurized through the 1 μm filter until all the carbon dioxide is recovered. Examination of the interior of the vessel shows deposited crystals which are recovered and weighed. Additionally, after the main vessel is depressurized, the filter is removed and washed with distilled water five times. All the wash water is collected and concentrated to precipitate the sodium nitrite crystals which are weighed. The combined weight of the crystals recovered from the second pressure vessel and the very small amount recovered from the filter, is more than 99 gm, indicating that essentially all the crystals went into solution in the SC—CO$_2$.

The solubilities of NaCl and NaNO$_2$ crystals are determined separately using a slight modification, to test the solubility in quiescent SC—CO$_2$ rather than by flowing SC—CO$_2$ through the pressure vessel, as follows:

The solubility of NaCl crystals was first tested by loading 100 g into a glass vial that was capped with coarse Whitman® filter paper which was taped to the vial with Teflon® tape. The vial is then loaded into the pressure vessel which is pressurized, as before, to 13.78 MPa (2000 psia) at 40° C. The pressure is maintained for 3 hr, after which the pressure vessel is cooled and depressurized. The crystals are recovered and dried at 60° C. for 1 hr, then weighed.

The foregoing procedure is repeated with another 100 g of NaCl crystals.

No measurable difference in the weights of the crystals, before and after being soaked in SC—CO$_2$ is observed, indicating that NaCl crystals are essentially insoluble in quiescent SC—CO$_2$.

Next, 100 g of NaNO$_2$ crystals were loaded into the vial, the mouth of which is capped with filter paper and taped to the vial as before, the vial loaded into the pressure vessel which was then pressurized to 13.78 MPa (2000 psia) at 40° C. As before, the pressure is maintained for 3 hr, after which the pressure vessel is cooled and depressurized. The crystals are recovered and dried at 60° C. for 1 hr, then weighed.

The foregoing procedure is repeated a second time.

The average reduction in weight of the crystals in the vial was 27.2±3.3%.

From the foregoing it is evident that NaNO$_2$ crystals which are essentially insoluble in high-pressure, near supercritical liquid CO$_2$ are soluble in quiescent SC—CO$_2$ to an extent of about 27%.

The supercritical properties of a variety of compounds are shown below in Table 3.

TABLE 3

| Fluid | Critical Temperature (° C.) | Critical Pressure (MPa) |
|---|---|---|
| Carbon Dioxide | 31.4 | 7.38 |
| Nitrous Oxide | 36.5 | 7.26 |
| Ethylene | 9.3 | 5.03 |
| Ethane | 32.3 | 4.88 |
| Trifluoromethane | 25.2 | 4.83 |
| Chlorotrifluoromethane | 29.9 | 3.92 |
| Ethanol | 240.8 | 62.2 |
| Acetone | 234.9 | 46.4 |

As is evident from the data in the above Table, SC-ethanol and SC-acetone would require conditions very different from those required to make SC—CO$_2$.

Polymers which lend themselves to be impregnated or may be formed from any rubber or polymer capable of being swollen by at least about 2 percent by volume, or by at least about 5 percent by volume, or even by at least about 7 percent by volume by the supercritical fluid being utilized in the present invention. Such polymers include natural rubbers, polyisoprene polymers, styrene-butadiene polymers, butyl rubbers, chloroprene polymers, polyamides, polyimides, polyesters, nitrite rubbers, polyacrylic polymers, polystyrene polymers, fluoro polymers (e.g., polytetrafluoro ethylene or polyvinylidene fluoride), vinyl chloride polymers, vinylidene chloride polymers, polycarbonate polymers, polyurethane polymers, polyacetylenes and polyolefins. In another embodiment, the present invention can also be utilized to infuse one or more additives into a precursor or resin used to form the above-listed polymer compositions. Most preferred are polyolefins, and polyethylene (PE) and polypropylene (PP) in particular which may be required to be substantially transparent.

The process described herein also enables one to infuse one or more alkali metal nitrites and organic compounds into a biodegradable polymer, biodegradable polymer precursor or resin or a pre-formed biodegradable polymer article. Any polymer which exhibits biodegradability can be utilized in conjunction with the present invention. Examples of suitable biodegradable polymers include, but are not limited to, biodegradable polyesters (e.g., linear poly ϵ-caprolactone (PCL)), biodegradable polylactic acid polymers, biodegradable polyester amide polymers, biodegradable polyester urethane polymers and biodegradable copolymers of any combination of two or more of the above.

Though any organic compound soluble in SC—CO$_2$ may be combined with the less than 2% by weight of alkali metal nitrite in solution, most preferred are VCIs such as are disclosed in U.S. Pat. Nos. 4,290,912; 5,320,778 and 5,855,975, which are incorporated by reference thereto as if fully set forth herein; and, commonly used antioxidants such as the 2,4,6-tri-substituted phenols exemplified by BHT (2,4,6-tributyl hydroxy toluene)

To illustrate that a PE substrate may have even larger amounts of sodium nitrite crystals than 2% by weight, deposited in the polymer, the following experiments are set forth:

Two rectangular pieces of PE film, 4.5"×2.5"×0.0039", and a piece of polyethylene tubing having an outside diameter of 1.75" and 0.0039" thick, are weighed and placed in the main pressure vessel described above. The vessel is then charged with a 20 wt % solution of $NaNO_2$ in supercritical $CO_2$ at a temperature of 50° C. and a pressure of 176.9 atm (2600 psi) for about 30 minutes.

After 30 minutes, the items are removed and reweighed. The two rectangular films of PE show a weight gain which correlates to an infusion rate of 9.38 wt % and 10.87 wt %. The PE tubing shows a weight gain which correlates to an infusion rate of 6.64 wt %.

As can be seen from Tables 4 to 6 below, as the pressure, time, or temperature at which the infusion or diffusion process is conducted varies, so does the amount of additive incorporated into the polymer. For the results listed in Tables 4 to 6, PE pellets having a diameter of about 0.2" are used with $NaNO_2$ in solution in $CO_2$ under the conditions described immediately above.

TABLE 4

| Pressure (atm/psi) | Weight Percent Increase |
|---|---|
| 163.3 atm (2400 psi) | 3.06 |
| 204.1 atm (3000 psi) | 8.50 |

TABLE 5

| Time (hr) | Weight Percent Increase |
|---|---|
| 0.5 | 3.06 |
| 1.0 | 8.50 |
| 3.0 | 14.84 |

TABLE 6

| Temperature (° C.) | Weight Percent Increase |
|---|---|
| 40 | 5.26 |
| 50 | 3.06 |
| 60 | 4.46 |

From the forgoing it is evident that the amount of alkali metal nitrite crystals which can be deposited in a polymer substrate may be controlled by controlling the time of immersion and the particular conditions of the supercritical phase.

We claim:

1. A process for infusing a synthetic resinous substrate with an alkali metal nitrite, comprising the steps of:
   depositing alkali metal nitrite crystals in a pressure vessel and pressurizing the vessel with carbon dioxide until supercritical conditions are attained, said alkali metal nitrite being substantially soluble in said supercritical carbon dioxide and the amount of said alkali metal nitrite crystals being from about 0.1% to about 15% by weight based upon the total weight of said alkali metal nitrite crystals and said carbon dioxide;
   contacting the synthetic resinous substrate with the solublized alkali metal nitrite supercritical solution for a time sufficient to transfer at least a portion of the alkali metal nitrite into the synthetic resinous substrate while maintaining the carbon dioxide under supercritical conditions; and,
   decreasing pressure or temperature, or both, on the synthetic resinous substrate sufficiently to evolve carbon dioxide so that alkali metal nitrite crystals are infused in said substrate in an amount from about 0.1% to about 15% by weight based upon the total weight of said nitrite crystals and said substrate.

2. The process of claim 1, including adding said synthetic resinous substrate to said pressure vessel before pressurizing said vessel to attain said supercritical condition, and wherein more than 90% of said infused crystals are in a size range smaller than 10 microns.

3. The process of claim 1, including transferring at least a portion of said supercritical solution containing said solublized alkali metal nitrite to a second vessel containing said synthetic resinous substrate, and wherein more than 90% of said infused crystals are in a size range smaller than 10 microns.

4. The process of claim 2, wherein said alkali metal nitrite comprises sodium nitrite or potassium nitrite, wherein said alkali metal nitrite crystals added to said pressure vessel have a size ranging from about 10 microns to about 44 microns, and wherein the amount of said alkali metal nitrite crystals infused in said substrate is up to about 8.5% by weight or less.

5. The process of claim 3, wherein said alkali metal nitrite comprises sodium nitrite or potassium nitrite, wherein said alkali metal nitrite crystals added to said pressure vessel have a size ranging from about 10 microns to about 44 microns, and wherein the amount of said alkali metal nitrite crystals infused in said substrate is up to about 8.5% by weight or less.

6. The process of claim 4, wherein the amount of said infused alkali metal nitrite is up to about 2% by weight or less.

7. The process of claim 5, wherein the amount of said infused alkali metal nitrite is up to about 2% by weight or less.

8. The process of claim 2, wherein said synthetic resinous substrate is a polymer comprising a natural rubber, a polyisoprene polymer, a styrene-budadiene polymer, a butyl rubber, a chloroprene polymer, a polyimide polymer, a polyester polymer, a nitrile rubber, a polyacrylic polymer, a polystyrene polymer, a fluoro polymer, a vinyl chloride polymer, a vinylidene chloride polymer, a polycarbonate polymer, a polyurethane polymer, a polyacetylene polymer, or a polyolefin polymer, or a combination thereof, or
   wherein said synthetic resinous substrate is a biodegradable polymer comprising a biodegradable polyester, a biodegradable polylactic acid polymer, a biodegradable polyester amide polymer, or a biodegradable polyester urethane polymer, or copolymers of any two or more of the biodegradable polymers.

9. A process for infusing crystals of an alkali metal nitrite into a polymeric substrate, comprising the steps of:
   (i) dissolving the alkali metal nitrite in carbon dioxide contained in a vessel under supercritical conditions to form a solution containing from about 1 to 15% by weight of the alkali metal nitrite based upon the total weight of the alkali metal nitrite and said carbon dioxide;

(ii) filtering the solution to ensure that substantially no particulate solids are present in filtered solution;

(iii) contacting the polymeric substrate under supercritical condition with the filtered solution for less than 30 minutes so as to infuse said substrate with less than about 15% by weight of the alkali metal nitrite; and (iv) decreasing the pressure on the substrate so that the polymeric substrate is infused with up to about 15% by weight of alkali metal crystals smaller than about 10 microns based on the total weight of the alkali metal nitrite and the substrate.

10. The process of claim 9, wherein the alkali metal nitrite crystals deposited in the pressure vessel are in the size range from about 10 microns to 44 microns, wherein said infused crystals are present in an amount less than about 8.5% by weight, wherein more than 90% of infused crystals are in a size range smaller than 10 micron, and wherein said alkali metal nitrite is sodium nitrite, or potassium nitrite, or both.

11. The process of claim 9 including introducing a second fluid miscible with carbon dioxide to form a common supercritical phase.

12. The process of claim 3, wherein said synthetic resinous substrate is a polymer comprising a natural rubber, a polyisoprene polymer, a styrene-budadiene polymer, a butyl rubber, a chloroprene polymer, a polyamide polymer, a polymide polymer, a polyester polymer, a nitrile rubber, a polyacrylic polymer, a polystyrene polymer, a fluoro polymer, a vinyl chloride polymer, a vinylidene chloride polymer, a polycarbonate polymer, a polyurethane polymer, a polyacetylene polymer, or a polyolefin polymer, or a combination thereof, or wherein said synthetic resinous substrate is a biodegradable polymer comprising a biodegradable polyester, a biodegradable polylactic acid polymer, a biodegradable polyester amide polymer, or a biodegradable polyester urethane polymer, or copolymers of any two or more of the biodegradable polymers.

13. The process of claim 6, wherein said synthetic resinous substrate is said polyolefin, or said polyacrylic, or said biodegradable polymer.

14. The process of claim 7, wherein said synthetic resinous substrate is said polyolefin, or said polyacrylic, or said biodegradable polymer.

15. The process of claim 2, including a second supercritical fluid comprising ethylene, ethane, nitrous oxide, chlorotrifluoromethane, or trifluoromethane, or combinations thereof.

16. The process of claim 3, including a second supercritical fluid comprising ethylene, ethane, nitrous oxide, chlorotrifluoromethane, or trifluoromethane, or combinations thereof.

17. The process of claim 4, including adding an antioxidant to said pressure vessel before supercritical conditions are attained.

18. The process of claim 5, including adding an antioxidant to said pressure vessel before supercritical conditions are attained.

19. The process of claim 10, wherein said polymeric substrate is a polymer comprising a natural rubber, a polyisoprene polymer, a styrene-budadiene polymer, a butyl rubber, a chloroprene polymer, a polyamide polymer, a polymide polymer, a polyester polymer, a nitrile rubber, a polyacrylic polymer, a polystyrene polymer, a fluoro polymer, a vinyl chloride polymer, a vinylidene chloride polymer, a polycarbonate polymer, a polyurethane polymer, a polyacetylene polymer, or a polyolefin polymer, or combinations thereof, or wherein said polymeric substrate is a biodegradable polymer comprising a biodegradable polyester, a biodegradable polylactic acid polymer, a biodegradable polyester amide polymer, or a biodegradable polyester urethane polymer, or copolymers of any two or more of the biodegradable polymers.

20. The process of claim 19, wherein said infused crystals are present in an amount up to about 2% by weight in said substrate.

21. The process of claim 19, wherein said polymer is a polyolefin or a polyacrylic.

22. The process of claim 19, including adding an antioxidant to said pressure vessel before supercritical conditions are attained.

* * * * *

UNITED STATES PATENT AND TRADEMARK OFFICE
CERTIFICATE OF CORRECTION

| | | |
|---|---|---|
| PATENT NO. | : 7,217,749 B2 | Page 1 of 1 |
| APPLICATION NO. | : 10/844838 | |
| DATED | : May 15, 2007 | |
| INVENTOR(S) | : Mehmet A. Gencer et al. | |

It is certified that error appears in the above-identified patent and that said Letters Patent is hereby corrected as shown below:

Column 10,

Claim 8, line 48, after "a chloroprene polymer," the words --a polyamide polymer,-- are missing from the claim.

Column 11,

Claim 12, line 26, please correct the word "polymide", should be --polyimide--.

Signed and Sealed this

Seventeenth Day of July, 2007

JON W. DUDAS
*Director of the United States Patent and Trademark Office*